United States Patent
Griesbach et al.

(10) Patent No.: US 11,635,133 B2
(45) Date of Patent: Apr. 25, 2023

(54) TRANSMISSION FOR A MOTOR VEHICLE, AND ELECTRIC AXLE DRIVE

(71) Applicant: ZF Friedrichshafen AG, Friedrichshafen (DE)

(72) Inventors: Michael Griesbach, Langenargen (DE); Thorsten Müller, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 18 days.

(21) Appl. No.: 17/494,328

(22) Filed: Oct. 5, 2021

(65) Prior Publication Data

US 2022/0107016 A1 Apr. 7, 2022

(30) Foreign Application Priority Data

Oct. 6, 2020 (DE) ..................... 10 2020 212 588.0

(51) Int. Cl.
*F16H 57/029* (2012.01)
*H02K 11/40* (2016.01)
(Continued)

(52) U.S. Cl.
CPC ......... *F16H 57/029* (2013.01); *F16H 57/021* (2013.01); *F16J 15/3228* (2013.01);
(Continued)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 6,755,572 B1 6/2004 Kinbara
2010/0001602 A1* 1/2010 Bossaller ............... H02K 11/40
29/596

(Continued)

FOREIGN PATENT DOCUMENTS

| DE | 10249770 A1 | 5/2004 |
| DE | 19983988 B4 | 11/2005 |
| JP | 2000244180 A | 9/2000 |

OTHER PUBLICATIONS

German Search Report DE 10 2020 212 588.0, dated Dec. 4, 2020. (12 pages).

*Primary Examiner* — Nathan Cumar
(74) *Attorney, Agent, or Firm* — Dority & Manning, P.A.

(57) ABSTRACT

A transmission (G) for a motor vehicle includes a housing (GG), a shaft (W, GW2, DS1, DS2) mounted in the housing (GG) and protruding from the housing (GG), a radial shaft seal (DR) having a sealing lip for sealing an oil space (NR) within the housing (GG) with respect to an exterior, a shaft grounding device (E) arranged on an exterior side of the radial shaft seal (DR) for establishing an electrically conductive sliding contact (SK) between the shaft (W, GW2, DS1, DS2) and the housing (GG), and a sleeve-shaped covering element (C) fixedly connected to the shaft (W, GW2, DS1, DS2) for protecting the sliding contact (SK) against environmental influences. The shaft grounding device (E) is fixedly connected to the housing (GG). The covering element (C), together with the grounding device (E), forms a labyrinth sealing. An electric axle drive (EA) may include the transmission (G).

13 Claims, 7 Drawing Sheets

(51) Int. Cl.
*F16H 57/021* (2012.01)
*F16J 15/3228* (2016.01)
*F16J 15/3232* (2016.01)
*F16J 15/3244* (2016.01)
*F16J 15/447* (2006.01)
*B60K 17/00* (2006.01)

(52) U.S. Cl.
CPC ....... *F16J 15/3232* (2013.01); *F16J 15/3244* (2013.01); *F16J 15/447* (2013.01); *H02K 11/40* (2016.01); *B60K 17/00* (2013.01)

(58) Field of Classification Search
CPC .. F16J 15/3228; F16J 15/3232; F16J 15/3244; F16J 15/447; F16J 15/4472; F16J 15/4474; F16J 15/4476; F16J 15/4478; F16H 57/00; F16H 57/029; F16H 57/021; F16H 57/0213; F16H 57/0216; F16H 57/022; B60K 17/00
USPC ........................................................ 277/559
See application file for complete search history.

(56) References Cited

U.S. PATENT DOCUMENTS

2017/0126105 A1* 5/2017 Okada .................... F16H 57/02
2018/0274626 A1* 9/2018 Komyo ................ F16F 15/126
2019/0113080 A1* 4/2019 Kamiya ................ F16J 15/447

* cited by examiner

TRANSMISSION FOR A MOTOR VEHICLE, AND ELECTRIC AXLE DRIVE

CROSS-REFERENCE TO RELATED APPLICATION

The present application is related and has right of priority to German Patent Application No. 102020212588.0 filed in the German Patent Office on Oct. 6, 2020, which is incorporated by reference in its entirety for all purposes.

FIELD OF THE INVENTION

The invention relates generally to a transmission for a motor vehicle, and to an electric axle drive for a motor vehicle having a transmission of this type.

BACKGROUND

From the prior art, it is known to electrically ground a transmission shaft with respect to a housing by a shaft grounding. As a result, for example, damage to the shaft bearings can be avoided, which is caused by a current passage across the shaft bearings. In addition, by grounding the shaft with respect to the housing, an electromagnetic emission of interference signals starting from the shaft can be avoided or at least reduced.

In this regard, for example, patent application JP 2000-244180A teaches a device for reducing electromagnetic interference signals for an electric vehicle. A rotating shaft of the electric drive is electrically coupled to a housing of the electric drive by a sliding contact. The sliding contact is protected against contaminants by a cover connected to the housing. A fixedly covered approach of this type is possible only in the area of the shaft end, however.

An approach for a shaft grounding of a transmission that is remote from the shaft end is described in patent application DE 102 49 770 A1. According thereto, a protective cap, together with a bypass ring, is fixedly connected to the shaft. The bypass ring is pressed, at a largest diameter, against a housing and slides along there, and so an electrically conductive contact is formed between the shaft and the housing. However, there is a risk that liquid and dirt particles will enter the area of the sliding contact, and so the electrical conductivity of the sliding contact deteriorates as the period of operation increases. In addition, there is a high circumferential speed of the sliding contact due to the large diameter of the sliding contact, as the result of which wear and friction work of the sliding contact increase.

SUMMARY OF THE INVENTION

Example aspects of the invention therefore provide a transmission, the shaft grounding of which is suitable for an application remote from the shaft end and is distinguished by a high durability against environmental influences.

As an example solution to the problem, a transmission for a motor vehicle is provided. The transmission includes a housing and a shaft mounted in the housing. At least one axial end of the shaft protrudes from the housing. The transmission includes a radial shaft seal having a sealing lip in order to seal an oil space, which is arranged within the housing, with respect to the surroundings. Moreover, the transmission includes a shaft grounding device, which is configured for establishing an electrically conductive sliding contact between the shaft and the housing, and a covering element fixedly connected to the shaft for protecting the sliding contact against environmental influences.

According to example aspects of the invention, the grounding device is fixedly connected to the housing, the covering element is fixedly connected to the shaft, and the covering element together with the grounding device forms a labyrinth sealing. The labyrinth sealing formed in this way is utilized for protecting the sliding contact against environmental influences and does not form a seal of the oil space. The sealing lip of the radial shaft seal is provided for sealing the oil space. Therefore, a clear functional separation between the radial shaft seal and the labyrinth sealing is achieved, allowing both components to be designed only for their particular task.

Preferably, the covering element has an axially aligned section, which encompasses an axial projection of the shaft grounding device. In this way, a "simple" labyrinth can be formed, which already protects the sliding contact against environmental influences.

Preferably, a radial gap is present between the axially aligned section of the covering element and the axial projection of the shaft grounding device. Due to the relative speed between the covering element rotating with the shaft and the rotationally fixed shaft grounding device, a flow arises in the radial gap, which improves the sealing effect of the labyrinth sealing.

Preferably, the covering element has a radially aligned projection. Due to this radial projection, the flow path of the labyrinth sealing can be lengthened, allowing the sealing effect of the labyrinth sealing to be improved.

Preferably, a radial gap is present between the radially aligned projection of the covering element and the housing. Liquid that has entered the labyrinth can easily escape through this radial gap, in that the liquid is slung out through the gap due to the relative movement between the covering element and the housing. Since the gap is designed radially and not axially, dripping water is easily prevented from entering the gap.

The radially aligned projection preferably adjoins the axially aligned section. Therefore, a simple and compact configuration of the covering element can be achieved.

Preferably, the covering element is attached on a diameter of the shaft that is larger than a diameter of the sliding contact. Due to the large attachment diameter, a particularly secure torque transmission between the shaft and the covering element is ensured, and so a simple press-fit connection between the covering element and the shaft suffices.

According to one preferred example embodiment, a surface of the covering element forms the shaft-side running surface of the sliding contact. For this purpose, the covering element has, at an inner diameter of the covering element, a radial section, the inner diameter of which rests against the shaft. On the axially opposite side, the radial section forms the running surface of the sliding contact. In this type of example embodiment, it is advantageous to produce the covering element from stainless steel.

The shaft grounding device can be designed, for example, as a brush. The brush ends establish the electrically conductive sliding contact with the shaft. The brushes are attached at an electrically conductive holder, wherein the holder is electrically conductively connected to the housing. Alternatively to the design as a brush, the sliding contact can be formed by electrically conductive PTFE elements. The conductivity of the PTFE can be achieved by appropriately conductive fillers.

Preferably, the shaft of the transmission is formed by an output shaft of the transmission. A further, transmissionexternal shaft is usually connected at the output shaft of the transmission in order to transmit the torque converted by the transmission to other components, for example, to driving wheels of the motor vehicle. Therefore, a simple covering of the shaft end of the output shaft is not possible, and so the approach with labyrinth sealing provided here is particularly advantageous.

Preferably, the transmission includes an electric machine and a power converter associated with the electric machine. Due to the pulse-like current supply of the electric machine by the power converter, electromagnetic interference signals can arise, which are coupled into the shaft. Due to the shaft grounding device, the interference signals can be coupled in an easy way to the housing of the transmission, which is usually connected to an electrical ground of the motor vehicle. As a result, a simple return path of the interference signals is made possible, and so the electromagnetic compatibility of the transmission is improved.

The transmission can be, for example, a planetary gear set-based automatic transmission, a dual-clutch transmission, an automated transmission, or a CVT transmission. All these transmissions can be exposed to environmental influences in the motor vehicle, such as spray water, salt, and dust, and so the approach with labyrinth sealing provided here is particularly advantageous.

Alternatively, the transmission provided here can be an integral part of an electric axle drive. These types of axle drives are also exposed to spray water, salt, and dust, and so the approach with labyrinth sealing provided here is particularly advantageous for this application.

BRIEF DESCRIPTION OF THE DRAWINGS

Exemplary embodiments of the invention are described in detail with reference to the following figures, in which FIG. 1 and FIG. 2 each show a drive train of a motor vehicle having a transmission.

DETAILED DESCRIPTION

Figure 1:
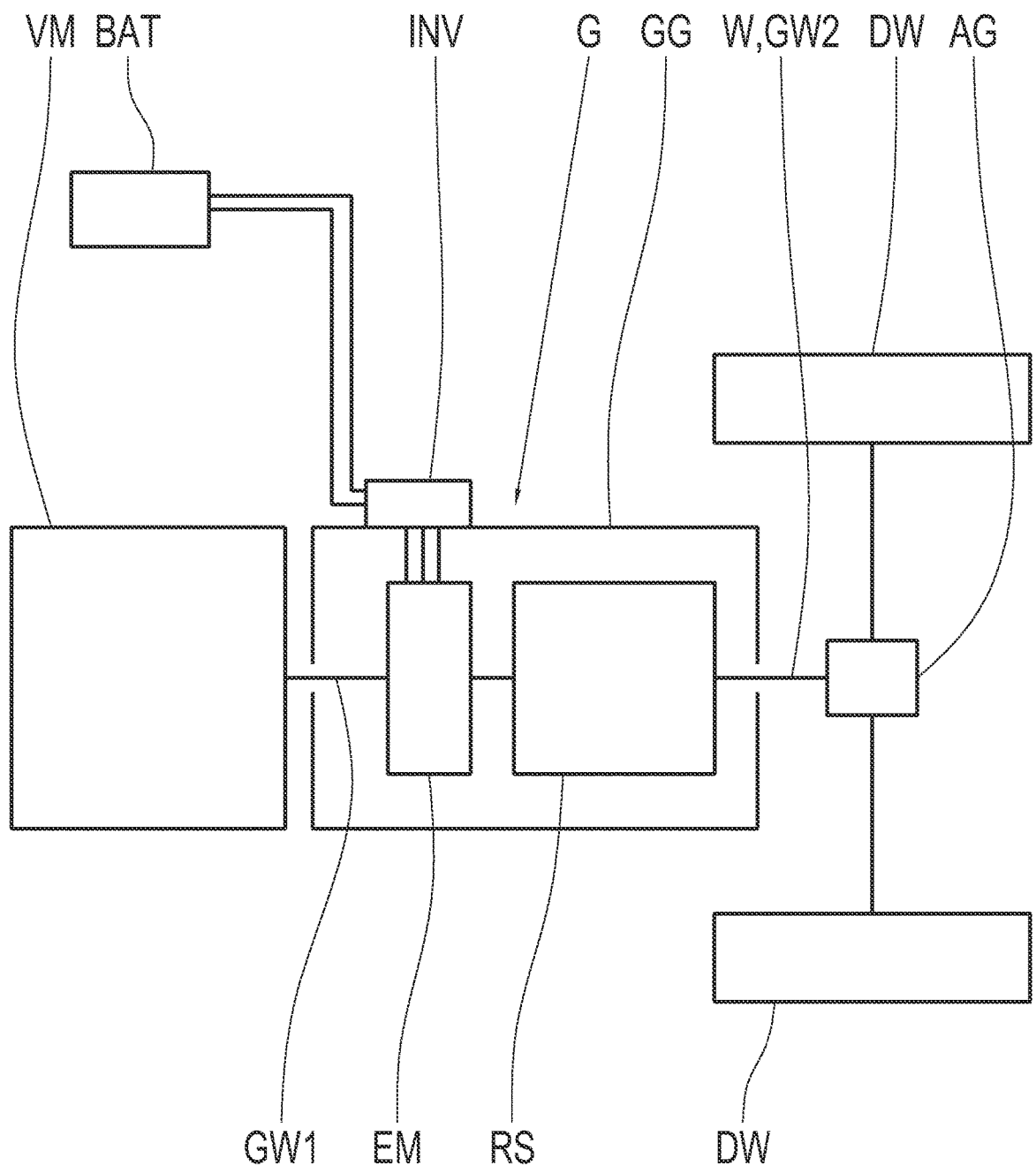

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 diagrammatically shows a drive train for a motor vehicle. The drive train includes an internal combustion engine VM, the output of which is connected to an input shaft GW1 of a transmission G. An output shaft GW2 of the transmission G is connected to a differential gear AG. The differential gear AG is configured for distributing the power applied at the output shaft GW2 to driving wheels DW of the motor vehicle. The transmission G has a gear set RS, which, together with shift elements not represented in FIG. 1, is configured for providing different transmission ratios between the input shaft GW1 and the output shaft GW2. The gear set RS is enclosed by a housing GG, which also accommodates an electric machine EM connected to the input shaft GW1. The electric machine EM is configured for driving the input shaft GW1. A power converter INV is attached at the housing GG. The power converter INV is connected, on the one hand, to the electric machine EM and, on the other hand, to a battery BAT. The power converter INV is utilized for converting the direct current of the battery BAT into an alternating current suitable for operating the electric machine EM and, for this purpose, includes several power semiconductors. The conversion between direct current and alternating current takes place by a pulse-like operation of the power semiconductors controlled by an open-loop system.

Figure 2:
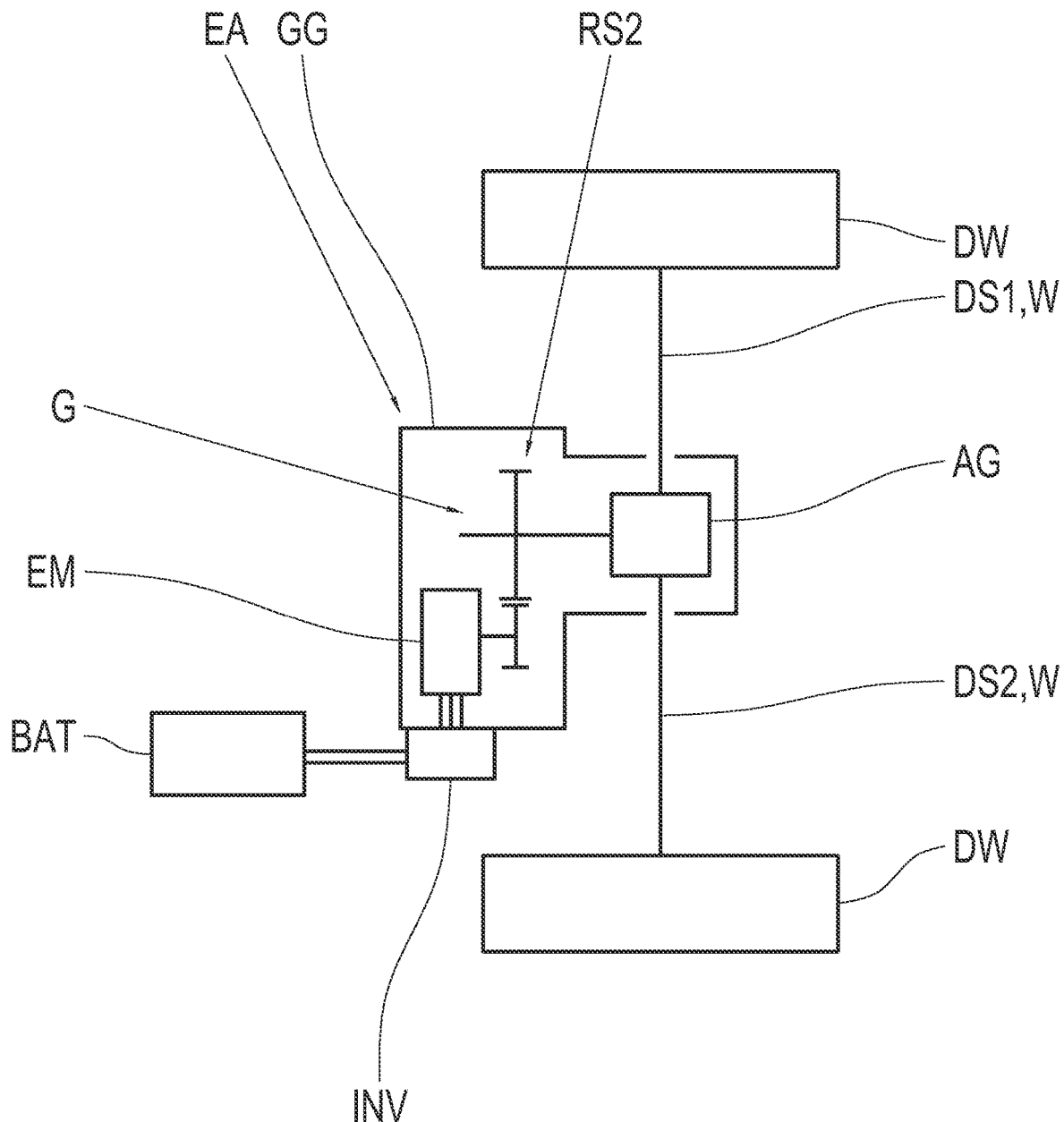

FIG. 2 diagrammatically shows a drive train for a motor vehicle, which, in contrast to the example embodiment represented in FIG. 1, is a purely electrical drive train. The drive train includes an electric axle drive EA. The electric axle drive EA includes an electric machine EM, the power of which is transmitted via a transmission G to driving wheels DW of a motor vehicle. The transmission G includes a reduction gear set RS2 and a differential gear AG. Output shafts DS1, DS2 of the differential gear AG are connected to the driving wheels DW. The transmission G of the electric axle drive EA is enclosed by a housing GG. A power converter INV is attached at the housing GG. The power converter INV is connected, on the one hand, to the electric machine EM and, on the other hand, to a battery BAT. The power converter INV is utilized for converting the direct current of the battery BAT into an alternating current suitable for operating the electric machine EM and, for this purpose, includes several power semiconductors. The conversion between direct current and alternating current takes place by a pulse-like operation of the power semiconductors controlled by an open-loop system.

The drive trains represented in FIG. 1 and FIG. 2 are to be considered merely as examples.

Due to the pulse-like operation of the power semiconductors, electromagnetic interference signals can arise, which, for example, are coupled into the output shaft GW2 in the drive train according to FIG. 1 or into the output shafts DS1, DS2 in the drive train according to FIG. 2. Due to the mounting of the output shaft GW2 and of the output shafts DS1, DS2, which is not represented in FIG. 1 and FIG. 2, respectively, the output shaft GW2 and the output shafts DS1, DS2 are electrically insulated with respect to the housing GG, however, since the lube oil in the interior of the housing GG has electrically insulating properties. Therefore, interference signals coupled into the output shaft GW2 cannot flow on a short path into the housing GG, which is connected to an electrical ground of the motor vehicle. Instead, the interference signals return to the electrical ground by electromagnetic emission, as the result of which other electronic components of the motor vehicle can be interfered with. The output shaft GW2 protruding from the housing GG and the output shafts DS1, DS2 can form an antenna, which supports the electromagnetic emission of the interference signals.

Figure 3:
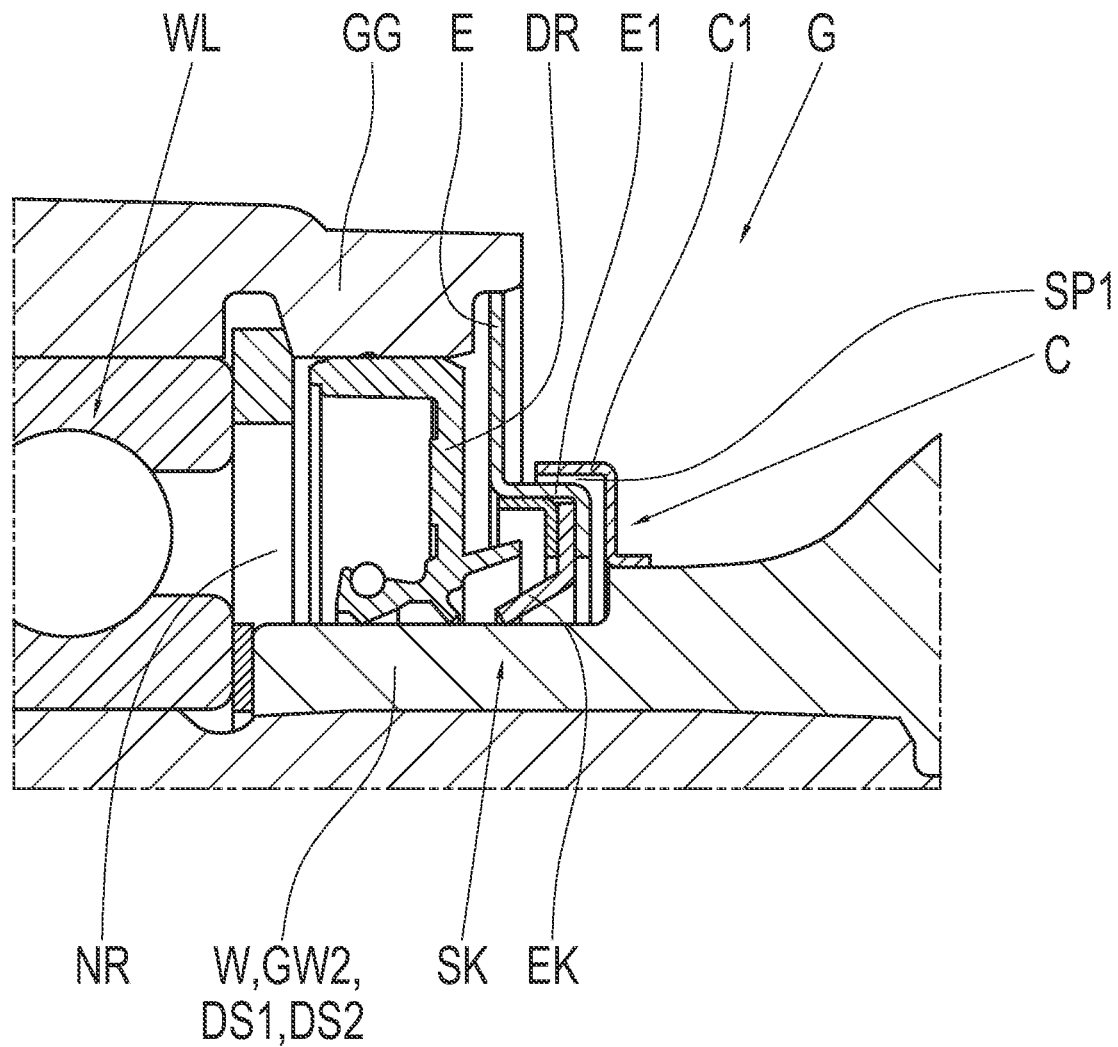
FIG. 3 through FIG. 6 each show a detailed sectional view of a transmission according to a first through fourth exemplary embodiment.

FIG. 3 shows a detailed partial, sectional view of a transmission G according to a first exemplary embodiment of the invention. Therein, the mounting and the seal of a shaft W protruding from the housing GG is represented in detail. The shaft W represented in FIG. 3 could be, for example, the output shaft GW2 according to FIG. 1 or one of the output shafts DS1, DS2 according to FIG. 2. The shaft W is designed as multiple pieces and is supported at the housing GG by a ball bearing WL. The ball bearing WL is located in an oil space NR of the transmission G. In order to seal the oil space NR with respect to the surroundings, a radial shaft seal DR is provided with a sealing lip. A shaft grounding device E is provided at the surroundings side of the radial shaft seal DR. The shaft grounding device E is mechanically and electrically conductively connected to the housing GG. For this purpose, contact and mounting extensions (not represented in FIG. 3) are provided, by which the shaft grounding device E is mechanically and electrically connected to the housing GG. Contact elements EK of the shaft grounding device E form an electrically conductive sliding contact SK to the circumferential surface of the shaft W. The contact elements SK can be, for example, brushes or electrically conductive PTFE elements.

The electrically conductive sliding contact SK can—as represented in FIG. 3—take place directly on the surface of the shaft W. The surface of the shaft W could be furnished with a coating in the area of the sliding contact, which improves the electrical contact to the contact elements SK. Alternatively, the race of the sliding contact SK could be formed by a sleeve (not represented in FIG. 3), which is attached on the shaft W, for example, a stainless steel sleeve. This applies in the same way for the exemplary embodiments according to FIG. 4 and FIG. 6.

A covering element C is provided in order to protect the electrically conductive sliding contact SK against environmental influences such as liquid or dust. The covering element C is fixedly connected to the shaft W, for example, by a press-fit connection. The covering element C and the shaft grounding device E, together, form a labyrinth sealing. The covering element C has an axially aligned section C1, which encompasses an axial projection E1 of the shaft grounding device E. A radial gap SP1 is present between the axially aligned section C1 and the axial projection E1. Due to the flow conditions in the gap SP1 between the covering element C rotating with the shaft and the non-rotating shaft grounding device E, a contactless seal is therefore formed. If water should enter the gap SP1 and, thereby, reach the sliding contact SK, the water can flow off at the spatial lower edge of the covering element C, and so, due to the shape of the covering element C, good protection of the sliding contact SK against dust and corrosion is formed.

Figure 4:
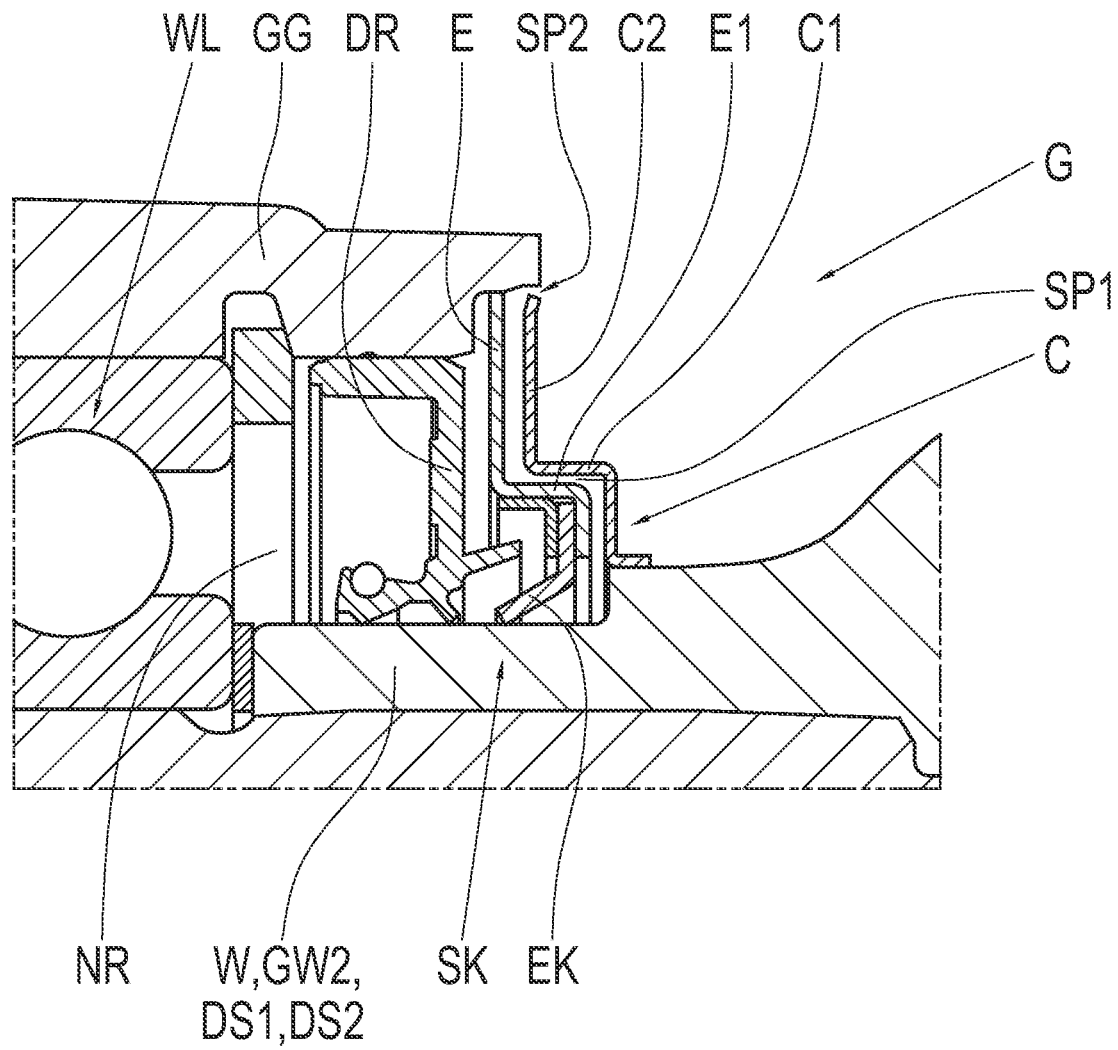

FIG. 4 shows a detailed sectional view of a transmission G according to a second exemplary embodiment of the invention, which essentially corresponds to the first exemplary embodiment represented in FIG. 3. The covering element C now has a radially outwardly aligned projection C2, which adjoins the axial section C1 and, in this way, lengthens the labyrinth path. A radial gap SP2 is present between the projection C2 and the housing GG, and so water dripping down at the housing GG cannot flow into the gap SP2. If water should enter the gap SP2, the water can flow off at the spatial lower edge of the covering element C, and so, due to the shape of the covering element C, good protection of the sliding contact SK against dust and corrosion is formed.

Figure 5:
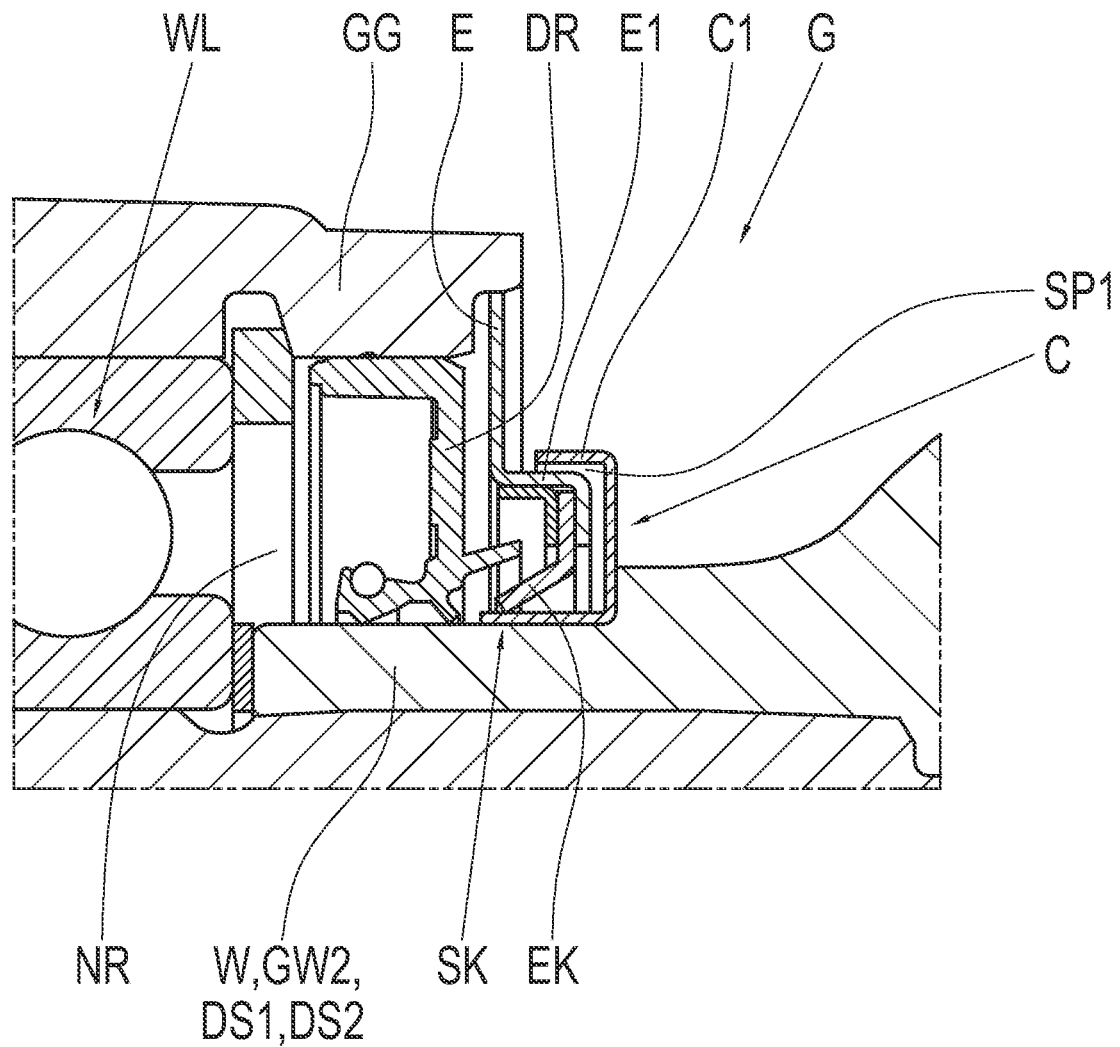

FIG. 5 shows a detailed sectional view of a transmission G according to a third exemplary embodiment of the invention, which essentially corresponds to the first exemplary embodiment represented in FIG. 3. The covering element C is now designed to be C-shaped, wherein the shaft-side running surface of the sliding contact SK is formed by a surface of the covering element C.

Figure 6:
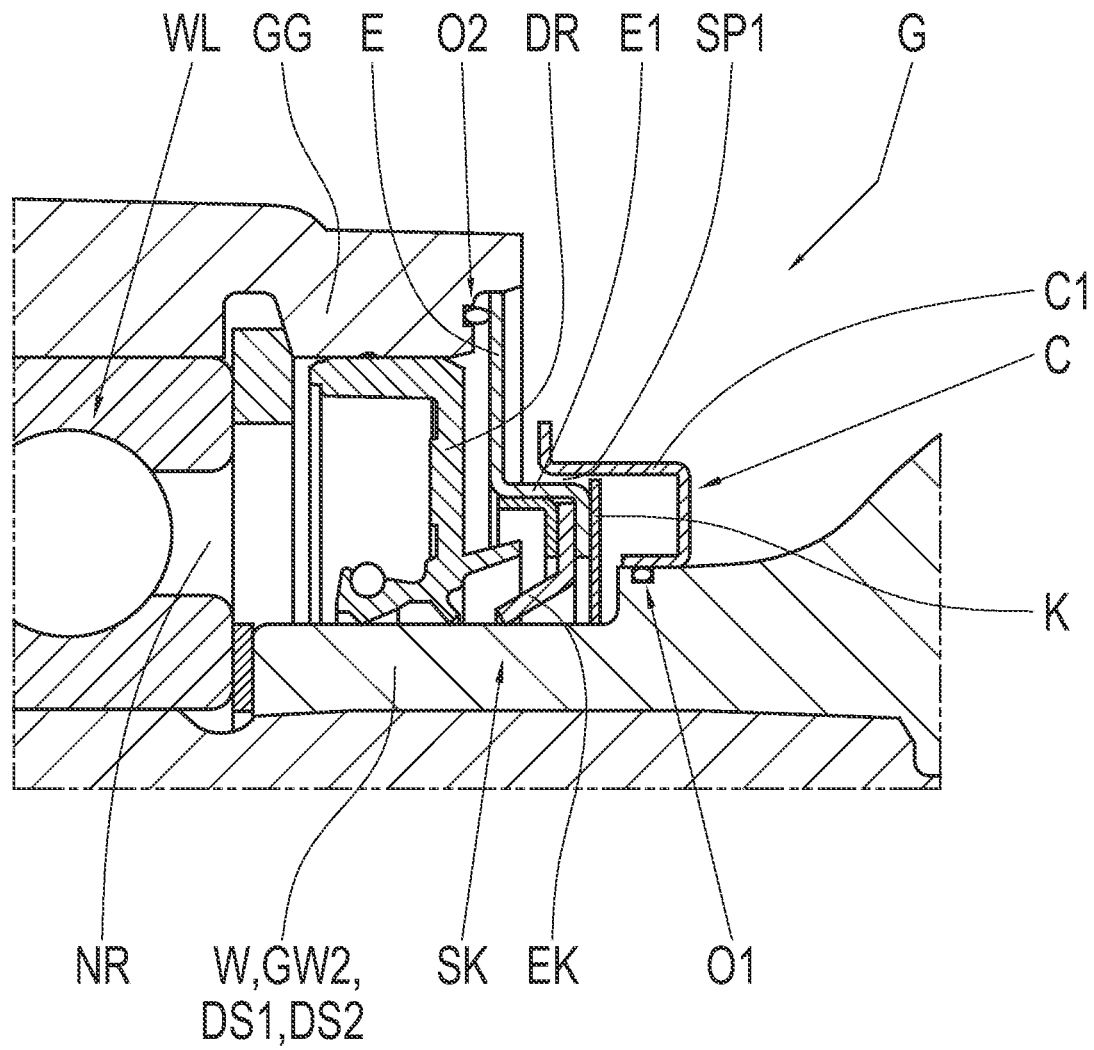

FIG. 6 shows a detailed sectional view of a transmission G according to a fourth exemplary embodiment of the invention, which essentially corresponds to the first exemplary embodiment represented in FIG. 3. An O-ring O1 is provided in order to prevent moisture from entering through the interference fit between the shaft W and the covering element C to the sliding contact SK. The shape of the covering element C is appropriately adapted in order to not damage the O-ring O1 while the covering element C is pressed onto the shaft W. The covering element C is now slid with the bend radius first onto the shaft W instead of over a free-standing edge.

Additionally, an O-ring O2 is provided in the transmission G according to the fourth exemplary embodiment. The O-ring O2 is arranged between the housing GG and a section of the shaft grounding device E. As a result, moisture or dust from above are easily prevented from entering the gap between the shaft grounding device E and the radial shaft seal DR. If dust, or the like, from above should nevertheless enter the gap between the shaft grounding device E and the radial shaft seal DR, it is captured by a dust lip of the radial shaft seal DR directed in the direction of the shaft grounding device E. The dust lip is arranged at the entire circumference of the radial shaft seal DR, allowing the contaminants to be discharged downward around the sliding contact SK. The O-ring O2 could be utilized in any of the aforementioned exemplary embodiments, regardless of the configuration of the covering element C.

Additionally, a cover cap K is provided in the transmission G according to the fourth exemplary embodiment. A cover cap K is attached at the shaft grounding device E and is made, for example, of a non-woven fabric, such as felt. The cover cap K offers an additional protection of the sliding contact SK against environmental influences. The cover cap K could be utilized in any of the aforementioned exemplary embodiments.

Figure 7:
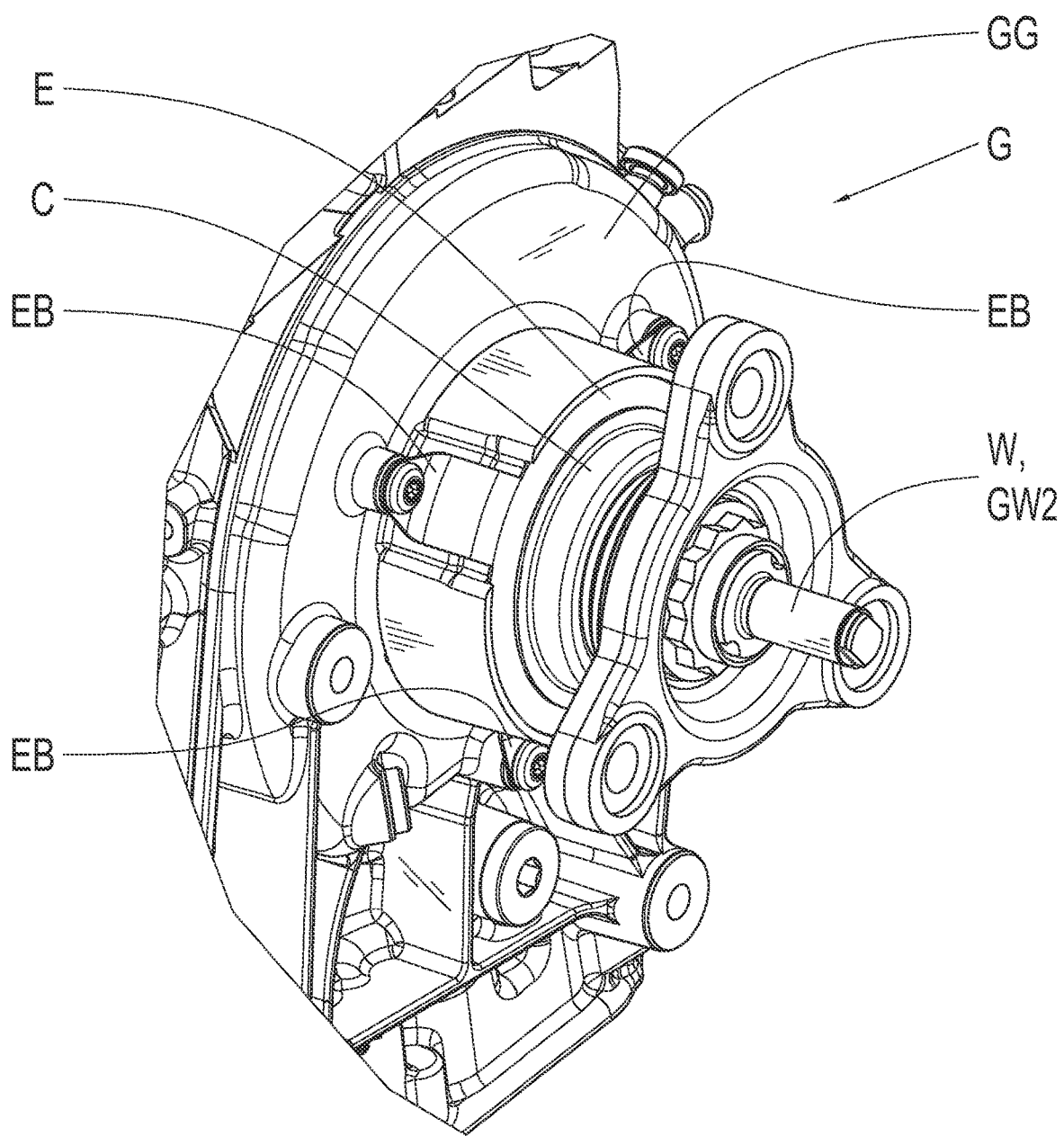
FIG. 7 shows a view of an output side of the transmission according to the fourth exemplary embodiment.

FIG. 7 shows an isometric view of an output side of the transmission G according to the fourth exemplary embodiment. Therein, it is clearly apparent that the shaft W protrudes from the housing GG. The shaft grounding device E is mechanically attached at the housing GG via multiple fastening tabs EB, wherein the electrical connection of the shaft grounding device E to the housing GG also takes place via the fastening tabs EB. The covering element C is designed to be sleeve-shaped and encloses a portion of the shaft grounding device E in order to protect the sliding contact SK (not visible in FIG. 7) against environmental influences.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
EA electric axle drive
G transmission
GW1 input shaft
GW2 output shaft
RS gear set
RS2 reduction gear set
EM electric machine INV power converter
BAT battery
AG differential gear
DS1 output shaft
DS2 output shaft
DW driving wheel
GG housing
WL ball bearing
DR radial shaft seal
NR oil space
E shaft grounding device
EK contact elements
EB fastening tabs
SK sliding contact
E1 axial projection
C covering element
C1 axially aligned section
C2 radially aligned projection
SP1 radial gap
SP2 radial gap
O1 O-ring
O2 O-ring
K cover cap

The invention claimed is:

1. A transmission (G) for a motor vehicle, comprising:
a housing (GG);
a shaft (W, GW2, DS1, DS2) mounted in the housing (GG) and protruding from the housing (GG);
a radial shaft seal (DR) comprising a sealing lip for sealing an oil space (NR) within the housing (GG) with respect to an exterior;
a shaft grounding device (E) arranged on an exterior side of the radial shaft seal (DR), the shaft grounding device (E) configured for establishing an electrically conductive sliding contact (SK) between the shaft (W, GW2, DS1, DS2) and the housing (GG); and
a sleeve-shaped cover (C) fixedly connected to the shaft (W, GW2, DS1, DS2), the cover (C) configured for protecting the sliding contact (SK) against environmental influences,
wherein the shaft grounding device (E) is fixedly connected to the housing (GG), and the cover (C) and the shaft grounding device (E) collectively form a labyrinth sealing.

2. The transmission (G) of claim 1, wherein the cover (C) comprises an axially aligned section (C1) that encompasses an axial projection (E1) of the shaft grounding device (E).

3. The transmission (G) of claim 2, wherein a radial gap (SP1) is defined between the axially aligned section (C1) of the cover (C) and the axial projection (E1) of the shaft grounding device (E).

4. The transmission (G) of claim 1, wherein the cover (C) comprises a radially aligned projection (C2).

5. The transmission (G) of claim 4, wherein a radial gap (SP2) is defined between the radially aligned projection (C2) of the cover (C) and the housing (GG).

6. The transmission (G) of claim 4, wherein:
the cover (C) comprises an axially aligned section (C1) that encompasses an axial projection (E1) of the shaft grounding device (E); and
the radially aligned projection (C2) of the cover (C) adjoins the axially aligned section (C1) of the cover (C).

7. The transmission (G) of claim 1, wherein the cover (C) is attached on a diameter of the shaft (W) that is larger than a diameter of the sliding contact (SK).

8. The transmission (G) of claim 1, wherein a surface of the cover (C) forms a shaft-side running surface of the sliding contact (SK).

9. The transmission (G) of claim 1, wherein the sliding contact (SK) of the shaft grounding device (E) comprises a brush or electrically conductive PTFE elements.

10. The transmission (G) of claim 1, wherein the shaft (W) comprises an output shaft of the transmission (G).

11. The transmission (G) of claim 1, further comprising an electric machine (EM) and a power converter (INV) associated with the electric machine (EM).

12. The transmission (G) of claim 1, wherein the transmission (G) is a planetary automatic transmission, a dual-clutch transmission, an automated transmission, or a CVT transmission.

13. An electric axle drive (EA) for a motor vehicle, comprising the transmission (G) of claim 1.

* * * * *